Jan. 26, 1971 S. KRAUTHAMER 3,559,038
INVERTER WITH PRECHARGE CIRCUIT
Filed May 28, 1969

Inventor
Stanley Krauthamer
By James J. Jennings, Jr.
Attorney

United States Patent Office 3,559,038
Patented Jan. 26, 1971

3,559,038
INVERTER WITH PRECHARGE CIRCUIT
Stanley Krauthamer, Monterey Park, Calif., assignor to Borg-Warner Corporation, Chicago, Ill., a corporation of Delaware
Filed May 28, 1969, Ser. No. 828,648
Int. Cl. H02m 7/52
U.S. Cl. 321—45                                   5 Claims

ABSTRACT OF THE DISCLOSURE

An inverter comprises a series circuit including a first diode, a first SCR, a first commutating choke winding, a second diode, a second SCR and the second commutating choke winding. Each of the two commutating capacitors is coupled in parallel with one SCR and its associated commutating choke winding. With this inverter series circuit the precharge circuit is simplified to include only a supply conductor and a pair of resistors.

BACKGROUND OF THE INVENTION

Figure 1:
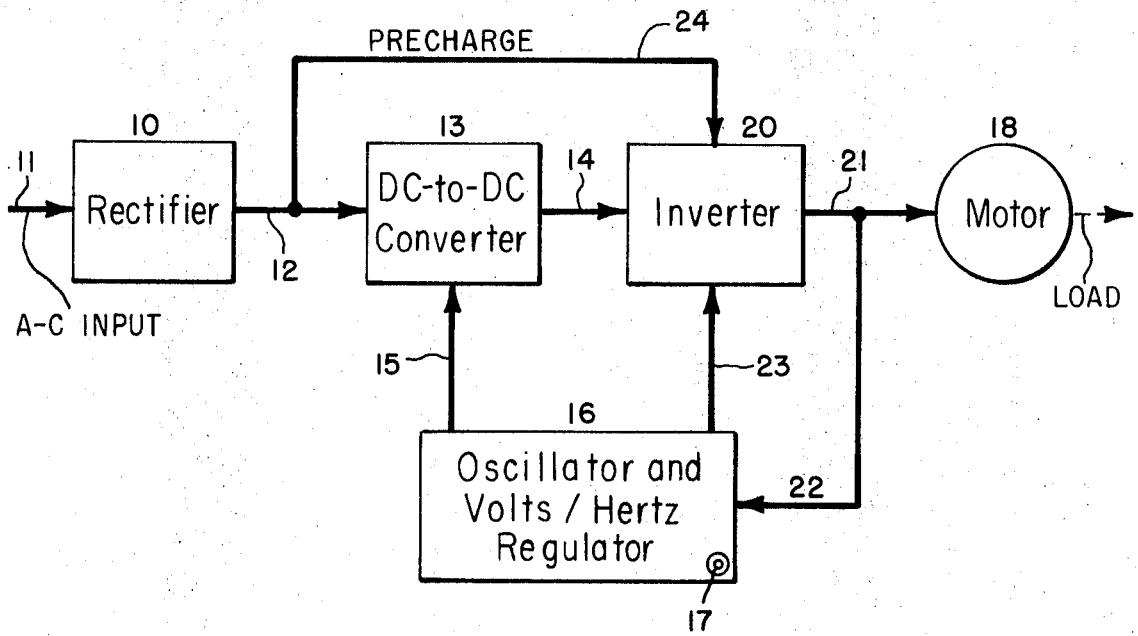

In the realm of AC motor control, inverter circuits have been developed which generally use commutating capacitors to apply a reverse voltage to the previously conducting silicon controlled rectifier (SCR) and effect shut off of the semiconductor switch. It is relatively simple to regulate the frequency of the inverter output voltage over an oscillator circuit. If a "chopper" or DC- to-DC converter is utilized between a fixed DC voltage supply and the inverter, the amplitude of the inverter AC output voltage can also be regulated. Manifestly, control of both these parameters affords regulation of the volts/hertz ratio of the inverter voltage passed to the AC motor. However, in achieving this regulation, the amplitude of the DC voltage supplied to the inverter sometimes is diminished to a level such that effective commutation is not achieved because the commutating capacitors are not adequately charged. Various attempts have been made to enhance the capacitor charge under these conditions.

One suggested solution is depicted in U.S. Pat. No. 3,355,654 which issued Nov. 28, 1967. This reference teaches a separate transformer with three secondary windings, and a separate rectifier bridge circuit between each secondary winding and the associated pair of commutating capacitors. A significant improvement over this teaching is disclosed and claimed in the application having Ser. No. 793,337, filed Jan. 23, 1969, assigned to the assignee of this invention, which requires only a single rectifier bridge circuit to supply all the capacitor pairs in a three-phase inverter. It is, of course, desirable to reduce the expense and physical dimensions of the precharge circuit still further, without in any way diminishing the effective performance of the inverter circuit.

SUMMARY OF THE INVENTION

An inverter circuit energizes an AC motor, and the inverter is energized by a DC voltage received over first and second input conductors from an adjustable DC voltage supply circuit, which in turn is energized from a constant level DC voltage supply. The inverter circuit comprises a first diode coupled to the first input conductor, and a first semiconductor switch or SCR is coupled to the first diode. A conventional commutating choke assembly, having first and second windings magnetically coupled to each other, is provided. The first winding is coupled to the first semiconductor switch, and a second diode is coupled to the first winding of the commutating choke assembly. A second semiconductor switch is coupled to the second diode, and the second winding of the commutating choke assembly is coupled between the second semiconductor switch and the second input conductor.

A first commutating capacitor is parallel-coupled with a series circuit comprising the first semiconductor switch and the first commutating choke winding. A second commutating capacitor is parallel-coupled with another series circuit comprising the second semiconductor switch and the second commutating choke winding.

A load conductor is coupled to the common connection between the first commutating choke winding and the second diode. A precharge circuit comprises a supply conductor coupled to the constant level DC voltage supply. A first impedance is coupled between the supply conductor and the common connection between the first diode, first semiconductor switch and first commutating capacitor. A second impedance is coupled between the supply conductor and the common connection between the second diode, second semiconductor switch, and second commutating capacitor.

THE DRAWING

Figure 2:
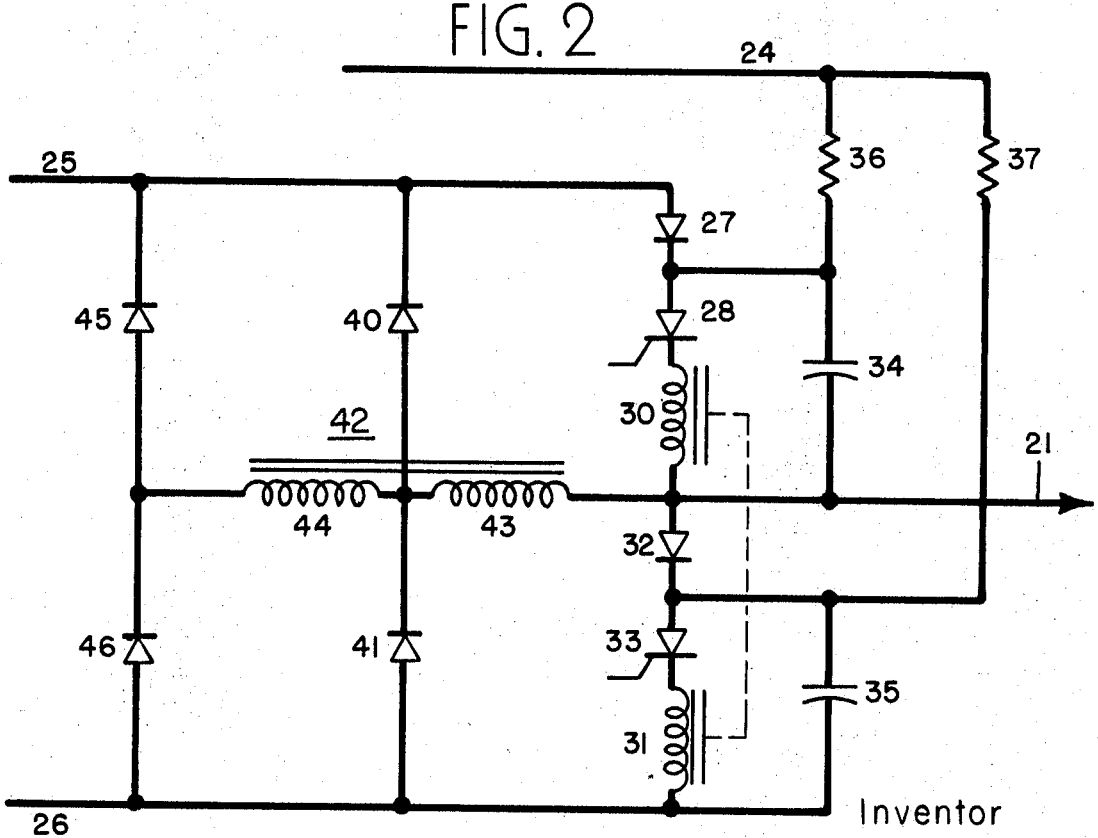

In the two figures of the drawing like reference numerals identify like elements and in the drawing:

FIG. 1 is a block diagram of a motor control system;
FIG. 2 is a partial schematic diagram illustrating incorporation of the present invention in the system shown generally in FIG. 1.

DETAILED DESCRIPTION OF THE INVENTION

As shown in FIG. 1, a motor control system in which the present invention is useful may include an input rectifier circuit for receiving an AC input voltage over a line 11 and providing a fixed DC supply voltage on output line 12. A DC-to-DC converter 13 is coupled between lines 12 and 14 to provide a variable DC supply voltage on line 14 in accordance with the level of a control signal received over line 15 from an oscillator and volts/hertz regulator circuit 16. This circuit may include an adjustable potentiometer or other means, represented by knob 17 in FIG. 1, for presetting a desired volts/hertz ratio of the energy to be passed to the motor 18.

An inverter 20 is coupled between DC supply line 14 and output line 21 over which the inverter AC output voltage is passed to the motor 18. A signal circuit includes a line 22 for applying an input signal, representing the actual AC output voltage of the inverter, to tre oscillator-regulator circuit 16. The oscillator-regulator over line 15 governs the amplitude of the DC voltage supplied to the inverter, and over line 23 provides another control signal for regulating the operating frequency of the inverter and thus govering the frequency of the inverter output voltage.

The precharge circuit is represented generally by line 24 in FIG. 1. It is a significant aspect of this invention to provide such a precharge arrangement with a maximum of simplicity and economy, and this will be more fully detailed in connection with FIG. 2.

The inverter circuit shown in FIG. 2 corresponds either to a single-phase inverter, or to one phase circuit of a multi-phase inverter. The single supply conductor 14 shown for illustrative purposes in FIG. 1 represented by first and second input conductors 25, 26 in FIG. 2 which pass an energizing DC voltage to the illustrated inverter arrangement. The precharge supply conductor 24 is shown, as is the output or load conductor 21 which passes the inverter AC output voltage to the motor 18.

Particularly in accordance with the inventive teaching, the inverter arrangement and precharge circuit of this invention comprises conventional circuit components coupled between input conductors 25, 26 but connected in a certain order to simplify the precharge circuit. As shown in the drawing the order of these components between conductors 25 and 26 includes a first decoupling diode 27; a first semiconductor switch 28, which may be a silicon controlled rectifier; a first winding 30 of a commulating choke assembly, which also comprises a second winding 31 magnetically coupled to the first winding 30; a second decoupling diode 32; a second semiconductor switch, or SCR, 33; and second winding 31 of the commutating choke assembly. A first commutating capacitor 34 is coupled at its upper end to the common connection between diode 27 and SCR 28, and at its lower end to the common connection between winding 30, diode 32 and output or load conductor 21. Second commutating capacitor 35 is coupled at its upper end to the common connection between diode 32 and SCR 33, and at its lower end to input conductor 26. The illustrated connection sequence of the components between input conductors 25, 26 makes possible a simplified precharge circuit.

In accordance with the inventive teaching, the precharge circuit in conjunction with the described inverter arrangement comprises only a first impedance 36 coupled between precharge supply conductor 24 and the common connection between diode 27 and SCR 28, and a second impedance 37 coupled between supply conductor 24 and the top of the second commutating capacitor 35. In the illustrated embodiment the first and second impedances are shown as simple resistors 36, 37. With this arrangement both the expense and complexity of the precharge circuit are minimized, and the physical space required for this arrangement is also substantially reduced as contrasted to earlier arrangements of precharge units.

Also shown in FIG. 2 are third and fourth diodes 40 and 41, coupled in series between the input conductors 25, 26. These diodes are conventionally used with their common connection coupled to the load conductor to facilitate the return of reactive energy from the load to the input circuit when a motor or other inductive load is supplied by the inverter. A "spillover" or energy return transformer is shown as an autotransformer 42 having a primary winding 43 and a secondary winding 44. The primary winding 43 has one end coupled between choke winding 30 and diode 32, and the other end coupled to the common connection between third and fourth diodes 40, 41. Secondary winding 44 has one end coupled to the common connection between diodes 40, 41 and its other end coupled to the common connection between fifth and sixth diodes 45, 46, coupled between conductors 25, 26 in the same sense as diodes 40 and 41. The spillover transformer, and diodes 40, 41, 45 and 46, are conventional components and have been explained in the literature so that no further description of their connection or operation is required.

While only a particularly embodiment of the invention has been described and illustrated, it is manifest that various alterations and modifications may be made therein. It is therefore the intention in the appended claims to cover all such modifications and alterations as may fall within the true spirit and scope of the invention.

What is claimed is:

1. An inverter circuit for energization by a DC voltage received over first and second input conductors, and a supply conductor for energization by a DC voltage which may differ from the voltage received over the first and second input conductors, which inverter circuit comprises:

a first diode coupled to the first input conductor,
a first semiconductor switch coupled to said first diode,
a first winding of a commutating choke assembly coupled to said first semiconductor switch,
a second diode coupled to said first winding of the commutating choke assembly,
a second semiconductor switch coupled to said second diode,
a second winding of said commutating choke assembly coupled between said second semiconductor switch and the second input conductor, and magnetically coupled to said first winding,
a first commutating capacitor, parallel-coupled with a series circuit comprising the fist semiconductor switch and the first commutating choke winding,
a second commutating capacitor, parallel-coupled with a series circuit comprising the second semiconductor switch and the second commutating choke winding,
a load conductor coupled to the common connection between the first commutating choke winding and the second diode,
a precharge circuit comprising said supply conductor,
a first impedance coupled between said supply conductor and the common connection between the first diode, first semiconductor switch and first commutating capacitor, and
a second impedance coupled between said supply conductor and the common connection between the second diode, second semiconductor switch, and second commutating capacitor.

2. An inverter circuit as claimed in claim 1 in which said first and second impedance each comprise a single resistor.

3. An inverter circuit as claimed in claim 1 and further comprising third and fourth diodes coupled in series between the first and second input conductors in a sense opposite that of the first and second diodes, and means for coupling said load conductor to the common connection between the third and fuorth diodes to facilitate return of energy from a reactive load.

4. An inverter circuit as claimed in claim 3 in which the means for coupling the load conductor to the common connection between the third and fourth diodes includes the primary winding of an autotransformer, and further comprising fifth and sixth diodes coupled in series between the first and second input conductors in the same sense as the third and fourth diodes, the secondary winding of the autotransformer having one end portion coupled to the common connection between the third and fourth diodes and the other end portion coupled to the common connection between the fifth and sixth diodes.

5. An inverter circuit for energization over first and second input conductors, having a precharge conductor for providing a voltage which is independent of the voltage passed over the first and second conductors, which inverter circuit also includes a series-coupled power transfer circuit, a load conductor, and a commuation circuit, said series circuit being coupled between the first and second input conductors and including, in the order named, a first diode, a first semiconductor switch, a first commutating choke winding, a second diode, a second semiconductor switch and a second commutating choke winding which is magnetically coupled to said first winding, said load conductor being coupled to the common connection between the first commutating choke winding and the second diode, said commutating circuit comprising a first commutating capacitor parallel-coupled with a first series circuit comprising the first semiconductor switch and the first commutating choke winding, a second commutating capacitor parallel-coupled with a second series circuit comprising the second semiconductor switch and the second commutating choke winding, a first impedance coupled between said precharge conductor and the common connection between the first diode, first semiconductor switch and first commutating capacitor, and a second impedance coupled between said precharge conductor and the common connection between the second diode, second semiconductor switch, and second commutating capacitor.

References Cited

UNITED STATES PATENTS

| | | | |
|---|---|---|---|
| 3,349,315 | 10/1967 | Studtmann | 321—45 |
| 3,355,654 | 11/1967 | Risberg | 321—44 |
| 3,384,804 | 5/1968 | Salihi | 321—45C |
| 3,405,346 | 10/1968 | Krauthamer | 321—45 |
| 3,449,654 | 6/1969 | Sheldrake et al. | 321—45C |

WILLIAM M. SHOOP, Jr., Primary Examiner